(No Model.)

E. W. FLAGG.
GRAIN SEPARATOR.

No. 387,869. Patented Aug. 14, 1888.

Attest:
Geo. T. Smallwood.
Jas. K. McCathran.

Inventor:
Eli W. Flagg.
by A. M. Smith & Son.
Attorneys.

UNITED STATES PATENT OFFICE.

ELI W. FLAGG, OF BATTLE CREEK, MICHIGAN, ASSIGNOR TO THE NICHOLS & SHEPARD COMPANY, OF SAME PLACE.

GRAIN-SEPARATOR.

SPECIFICATION forming part of Letters Patent No. 387,869, dated August 14, 1888.

Application filed February 10, 1888. Serial No. 263,595. (No model.)

*To all whom it may concern:*

Be it known that I, ELI W. FLAGG, of Battle Creek, county of Calhoun, and State of Michigan, have invented a new and useful Improvement in Grain Separators, of which the following is a full, clear, and exact description, reference being had to the accompanying drawings, making part of this specification.

My invention relates to the construction of the upper shaker and straw-carrier of thrashing-machines, whereby I am enabled to adapt it to the different kinds and conditions of grain to be operated upon, and to effect a more thorough separation of the grain from the straw than is done in the ordinary construction of said shaker. It will be understood from the following description and claim, reference being had to the accompanying drawings, in which—

Figure 1:
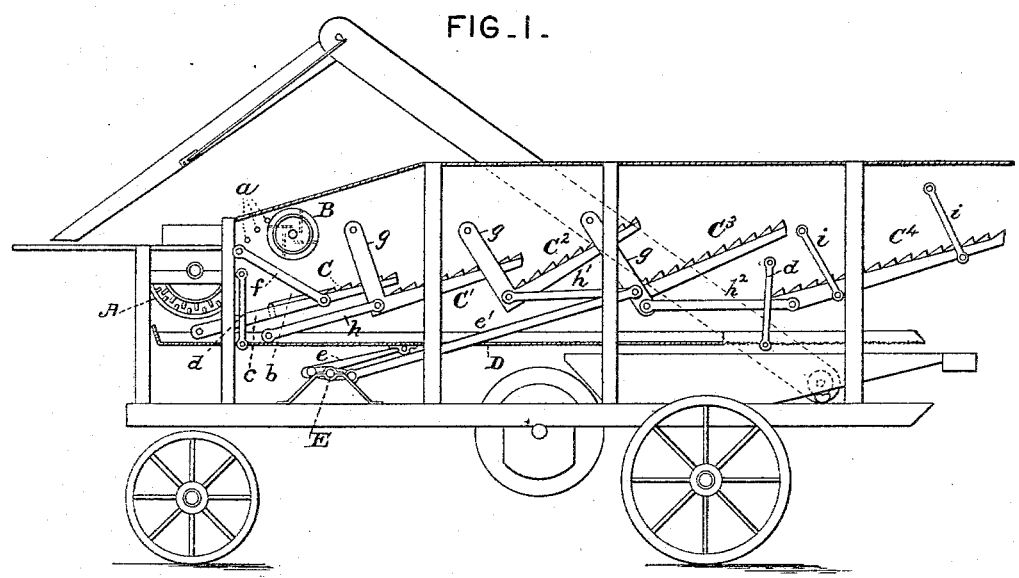
Figure 2:
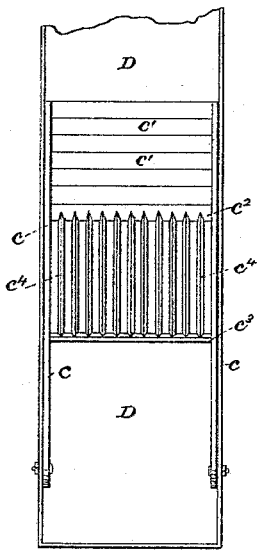
Figure 3:
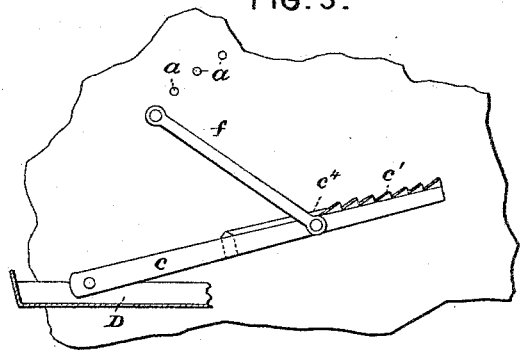

Figure 1 represents a side elevation of a thrashing-machine and grain-separator with the adjacent side frame-boards removed to show the construction and arrangement of the shaker and the relation of the same to the thrashing-cylinder and beater. Fig. 2 is a plan view, and Fig. 3 a side elevation, of the first upper shaker section detached.

The frame-work of the machine may be of any usual or preferred construction, and it need not, therefore, be described.

A indicates the thrashing-cylinder, and B the beater-reel, said parts also being of any usual or preferred construction. The upper shaker and straw-carrier is composed of a series of sections, (indicated by C, C', $C^2$, $C^3$, and $C^4$,) while the lower shaking-pan (indicated at D) is made, preferably, continuous and extends under the several sections of the upper shaker, receiving the grain therefrom. The shaking-pan D is supported by means of pendent links or straps $d$, pivoted at their upper ends to the sides of the machine-frame, and receives its longitudinal vibrating movements through links $e$, connecting it with a crank-shaft, E, to which motion is communicated from any suitable driving-shaft.

The crank-shaft E has cranks set opposite those which operate the pan D, and links $e'$ extend therefrom and connect with the rear sections of the upper shaker for operating the latter and moving them in opposite directions, alternating with the pan D in a manner and for a purpose well understood.

The forward section, C, of the upper shaker is composed of side bars, $c$ $c$, which are set in an inclined position and have their forward lower ends pivoted directly to the side bars of the lower shaker, said section receiving its motion therefrom. The side bars, $c$ $c$, are connected by a series of transverse inclined slats, $c'$, at their rear ends and forward of these slats by transverse bars $c^2$ $c^3$, which in turn are connected by longitudinal slats or rods $c^4$, which extend under the beater B and receive the straw and grain directly from the thrashing-cylinder. The rear end of the shaker-section C is upheld by links $f$, pivoted at their lower ends to the side bars of said section and at their upper ends to the sides of the frame, and the latter is provided with a series of pins or perforations, $a$, arranged in an arc of a circle of which the link $f$ is the radius, and through any one of which the upper end of the link may be pivoted to the frame, thereby making the upper ends of the links adjustable for changing the throw of the rear end of the section and giving it more or less of uplift without changing the position of said shaker at the lowest point of its downward throw or movement. This manner of regulating or adjusting the upward throw or tossing movement of this forward shaker-section in connection with the construction described is considered very important in the practical operation of the machine. The mingled straw and grain, as they are thrown out by the thrashing-cylinder, are caught by the beater B and a thrust down upon the longitudinal bars or slats of said section, and are swept backward after such downthrust terminates upon the transverse slats thereof, whereas if the downthrust of the beater were over the transverse slats the ends and bends of the straw would be caught between said transverse slats and held, preventing its backward movement and eventually clogging the machine. By connecting the section C to the lower shaker to receive its motion therefrom the only lifting action given to the extreme forward end of said section is that received from said lower section, whereas by adjusting the links $f$, supporting the rear end of said section, the upward throw of said end can be made just what is required for giving it the best possible action on the grain to be operated upon. In some conditions of grain, and especially when operating upon flax and other "fluffy" fibrous straw, too much uplift on the first shaker-section, operating as it does underneath the beater, causes the straw to roll back against the beater, sometimes seriously interfering with the proper working of the machine. This difficulty is readily obviated by the adjustment of the angle of the links $f$, as explained.

In the construction described in my former patent, No. 367,750, dated August 2, 1887, in which the forward receiving-section of the shaker was suspended on arms rigidly connected with its forward end, only a swinging motion with comparatively little uplift was given to the portion of said section immediately underlying the beater, and consequently little or no assistance was rendered by it to the beater in carrying the straw backward on the shaker, whereas in the present construction, while little lift is given to the forward ends of the extended side bars of the section, the portion of the latter underlying the beater, (indicated at $b$,) being intermediate the ends of the section, may have more or less uplifting action given to it by the adjustment of the angle of the links $f$, and so made to cooperate with and materially assist the beater in moving the straw backward on the shaker.

The longitudinal slats or bars under the beater prevent the grain from being caught and held by them under the downthrust of the beater referred to; but they permit the straw to more readily pass through between them in its onward movement than the inclined transverse slats do, and if continued beyond such downthrust of the beater would be liable to allow so much straw to pass through to the lower shaker as to interfere with the proper screening action of the latter. To prevent this and to insure the proper passage of the straw over the upper shaker, I provide the rear end of the section C, beyond the downthrust of the beater, with inclined transverse slats, which serve to carry the straw onward, while permitting the ready escape of the grain between them to the lower shaking screen.

The sections $C'$, $C^2$, and $C^3$ are made similar to those described in my former patent referred to, with horizontal side bars connected by inclined transverse slats, and provided at their forward ends with rigid upright arms $g$, which are pivoted at their upper ends to the sides of the machine-frame, this construction giving to the forward ends of the sections a swinging movement, which has been found very effective in practice.

The section $C'$ is preferably connected by link $h$ with the lower pan, D, so as to move, like section C, therewith, while the sections $C^2$, $C^3$, and $C^4$ are connected by links $h'$ $h^2$, and are operated together by rods or links $e'$, connected to cranks on shaft E, set opposite the crank or cranks operating the pan D and section C, as above explained. The rear shaker-section, $C^4$, like sections $C'$, $C^2$, and C, is provided with transverse inclined slats, but is preferably suspended on pivoted links $i$ $i$, arranged in pairs opposite each other in a well-known manner, as giving a more even and regular movement to the straw at and near the point of its discharge from the machine. The above-described construction and manner of operating the sections $C'$, $C^2$, $C^3$, and $C^4$ are preferred by me and have been found very effective in practice; but they may be constructed and operated in any usual manner so long as the forward section, C, is constructed and arranged to operate substantially as described.

Parts of the machine not specifically described may be constructed and arranged in any usual or preferred manner.

Having now described my invention, I claim as new—

The combination, with the pan of a grain-separator, of a straw-carrier composed of independently-supported and swinging sections, the forward section thereof being pivoted directly to the pan, and the adjustable supporting-links pivoted to said section and to the frame of the machine, substantially as and for the purpose described.

In testimony whereof I have hereunto set my hand this 3d day of February, A. D. 1888.

ELI W. FLAGG.

Witnesses:
A. A. ELLSWORTH,
FRANK W. DUNNING.